US012795516B2

(12) United States Patent
Schena et al.

(10) Patent No.: US 12,795,516 B2
(45) Date of Patent: Nov. 10, 2026

(54) SYSTEM AND METHOD FOR MANAGING BROADCAST COMMUNICATIONS IN A WIRELESS COMMUNICATION NETWORK

(71) Applicant: Position Imaging, Inc., Portsmouth, NH (US)

(72) Inventors: Drew Anthony Schena, Manchester, NH (US); Kyran Ergin, Portsmouth, NH (US)

(73) Assignee: Position Imaging, Inc., Portsmouth, NH (US)

( * ) Notice: Subject to any disclaimer, the term of this patent is extended or adjusted under 35 U.S.C. 154(b) by 186 days.

(21) Appl. No.: 18/619,309

(22) Filed: Mar. 28, 2024

(65) Prior Publication Data

US 2024/0334311 A1 Oct. 3, 2024

Related U.S. Application Data

(60) Provisional application No. 63/455,037, filed on Mar. 28, 2023.

(51) Int. Cl.
*H04W 48/10* (2009.01)

(52) U.S. Cl.
CPC .................................. *H04W 48/10* (2013.01)

(58) Field of Classification Search
CPC .................................................... H04W 48/10
USPC ........................................................ 455/41.2
See application file for complete search history.

(56) References Cited

U.S. PATENT DOCUMENTS

RE44,649 E 12/2013 Raaf et al.
10,681,591 B2 6/2020 Lee et al.
2016/0014693 A1* 1/2016 Patil ..................... H04W 72/30 370/254
2020/0195726 A1* 6/2020 Hanchett ................ H04L 67/12
2022/0151361 A1 5/2022 Hill et al.
2024/0185018 A1 6/2024 Schena

OTHER PUBLICATIONS

Woolley, Martin, "Bluetooth Core Specification Version 5.2 Feature Overview", Bluetooth, Version 1.0.1, Revision Date Dec. 9, 2020.

* cited by examiner

*Primary Examiner* — Eugene Yun
(74) *Attorney, Agent, or Firm* — Schmeiser Olsen, PLLC; Timothy P. Collins, Esq.

(57) ABSTRACT

Disclosed are a system and method for wireless communication comprising a plurality of end device identifiers arranged into a first list and a second list. The first list includes a plurality of target end device identifiers corresponding to a first group of wireless electronic devices for communicating with a central computing device. A filter list is generated having a plurality of filters such that each target end device identifier on the first list matches with exactly one filter of the filter list, and no end device identifiers on the second list match with any filter of the filter list. Electronic messages including the filters of the filter list are broadcast such that end device possessing an identifier from the first group receives and processes a message while no devices on the second accept any broadcast messages.

16 Claims, 9 Drawing Sheets

Target End Devices 801 0b1101001101101001011000101110010000001001100010011
802 0b1110110111100010100100100001001011011001100000100
803 0b1111011001010001101110101001101011110100111010 10

0b1110011011100011001110001100001010110010010001 01
0b1101110100100000001011000101001000110110111010 01
0b1100100100100001111011001000011011110111110011 01
0b1101101100110000101000110101010101111000110111 11
0b1110100010001101010100110111100000010110010001 10
0b1101111100011110101100010010001001100010101011 00
0b1110011111111111100010110100010001000100101011010
0b1100110100000110001001001001011010110110010100 01
0b1101001001101000000100010111011100100101001101 00
0b1100001101001010010101101101010011001111111011 11
0b1101000000101000001110111101010000111101001101 01
0b1110010110111010011011100010101101101000011111 10
0b1110010001011100110100001000000111111000000011000
0b1100010010101100000000010101110011110001111001 11
0b1100111111000111111001001111100100101010110110 11
0b1101011011100110101000001101000001110101000001 11
0b1110011001111001010110110100011001000000101100 01

FIG. 8B

811 Filter: 3 12 16 27 29 32 38 48

812 Value: 0b0000000000000000000000000000000000000100000000 0,

813 Mask: 0b001000000001000100000000001010010000010000000000

Num clips in filter: 5

Clips in filter:

815 0b1101110100100000001011000101001000110110111010 0

0b1100110100000110001001001001011010110110010100 0

0b1100001101001010010101101101010011001111111011 1

0b1101000000101000001110111101010000111101001101 0

0b1101011011100110101000001101000001110101000001 1 814

821 Filter:

822 Value: 0b001001000000000000000000000000000000000000000000,

Mask: 0b001111000000000000000000000010000000001 0000000000 823

Num clips in filter: 5

Clips in filter:

0b11100110111000110011100011000010101100 1001000101

0b11100111111111110001011010001000100010 0101011010

0b11100101101110100110111000101011011010 0001111110

0b11100100010111001101000010000011111100 0000011000

0b11100110011110010101101101000110010000 0010110001 824

831 Filter:

Value: 0b000000000000000000000000000010000000000000000000100,

Mask: 0b00010000000100000010110010010000000000000000001100

Num clips in filter: 3

Clips in filter:

0b11101101111000101001001000010010110110011000010 0

0b11101000100011010101001101111000000101100100011 0

0b11000100101011000000000101011100111100011110011 1

841 Filter:

Value: 0b000100100000000000000000000000000000000000000000,

Mask: 0b001101101000000000000001100000010001000000000000000

Num clips in filter: 3

Clips in filter:

0b1101001101101001011000101110010000001001100100 11

0b1101101100110000101000110101010101111000110111 11

0b1101001001101000000100010111011100100101001101 00

851 Filter:

Value: 0b00000000000000000101000000000000000010000010001000,

Mask: 0b00000000000000000101000000000000000010000010011000

Num clips in filter: 3

Clips in filter:

0b1111011001010001101110101001101011110100111010 10

0b1100100100100001111011001000011011110111110011 01

0b1101111110001111010110001001000100110001010101 00

861 Filter:

Value: 0b000000010000000100000000000000000000000000000000,

Mask: 0b000000010000010100000000000000000000000000000100

Num clips in filter: 1

Clips in filter:

0b1100111111100011111100100111110010010101010110 11011

FIG. 8C

SYSTEM AND METHOD FOR MANAGING BROADCAST COMMUNICATIONS IN A WIRELESS COMMUNICATION NETWORK

RELATED APPLICATIONS

This application claims priority to U.S. Provisional Application Ser. No. 63/455,037 filed Mar. 28, 2023, entitled "SYSTEM AND METHOD FOR MANAGING BROADCAST COMMUNICATIONS IN A WIRELESS COMMUNICATION NETWORK," the entirety of which is incorporated by reference herein.

FIELD

The present concepts relate generally to wireless communications, and more specifically, to managing broadcast communications in a wireless communication network.

BACKGROUND

Wireless device communications include the use of well-known protocols between a central device such as a computer hub or server and a plurality of client electronic devices, for example, Internet-of-Things (IoT) peripheral devices referred to as end devices. For example, a wireless communication system may include a computer server and one or more Bluetooth™ devices performing low energy Bluetooth™ (BLE). BLE offers benefits such as a low device production cost as well as low power consumption, and is typically implemented in applications where battery life is preferred over high data transfer speeds.

SUMMARY

In one aspect, a method for wireless communication comprises arranging a plurality of end device identifiers into a first list and a second list, the first list including a plurality of target end device identifiers corresponding to a first group of wireless electronic devices for communicating with a central computing device; generating a filter list having a plurality of filters such that each target end device identifier on the first list matches with exactly one filter of the filter list, and no end device identifiers on the second list match with any filter of the filter list; and broadcasting electronic messages including the filters of the filter list such that end device possessing an identifier from the first group receives and processes a message while no devices on the second accept any broadcast messages.

In another aspect, a system comprises a plurality of wireless electronic devices; and a central computing device that arranges end device identifiers of the wireless electronic devices into a first list and a second list, the first list including a plurality of target end point identifiers corresponding to a first group of the wireless electronic devices for communicating with a central computing device, the central computing device further comprising a filter list that includes a plurality of filters for all of the target end point identifiers so that electronic messages are exchanged only with the first group of wireless electronic devices according to the filters.

In another aspect, a computer system comprises a processor; a memory device coupled to the processor; and a computer readable storage device coupled to the processor. The storage device contains program code executable by the processor via the memory device to implement a method for processing an electronic communication, comprising: arranging a plurality of end device identifiers into a first list and a second list, the first list including a plurality of target end point identifiers corresponding to a plurality of wireless electronic devices for communicating with a central computing device; generating a filter list that includes a plurality of filters for all of the target end point identifiers; and transmitting electronic messages to the plurality of wireless electronic devices according to the filters.

In another aspect, an end device comprises a radio-frequency (RF) receiver receiving an RF communication including a bit string that corresponds to a filter, the filter determining one or more intended targets of the RF communication, the RF communication including an identification of which one or more bits of the filter are relevant for determining whether the end device is an intended target; memory configured to store an address of the end device; and a processor configured to compare the one or more relevant bits of the filter with the address of the end device and to produce a response to the RF communication if each value of the one or more relevant bits of the filter match each value of corresponding bits of the address of the end device.

In another aspect, a method for wireless communication comprises acquiring an address for each end device of a plurality of end devices that is within wireless communication range of a central device; identifying the address each end device of the plurality of end devices that is an intended target to receive a message; generating a set of one or more filters that corresponds to the address of each end device that is an intended target to receive the message and excludes the address of every non-target end device; and transmitting an RF communication for each generated filter, each RF communication carrying the message to each intended target identified by that generated filter.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention. In the drawings:

FIGS. 8A-8C are views of a test program result produced according to the method of FIG. 6.

DETAILED DESCRIPTION

In brief overview, embodiments of the present inventive concept improve electronic communications between wireless electronic devices participating in a one-to-many broadcast scheme on a shared, data-constrained medium. In particular, many devices communicate on a shared medium such as a radio channel with limited bandwidth and all end devices sharing the medium receive a broadcast such an advertisement from the central device, which consumes bandwidth when advertisements are sent to all intended targets for subsequent communications with the central device individually. In these embodiments, the central device can group the end devices in a predetermined manner by performing an iterative filtering process so that multiple end devices in a target list can receive and process each individual communication from the central device, which can reduce the total communication bandwidth by limiting the advertisement exchanges to those between the target end devices and the central device. The filtering process includes the generation of mask filters, which are applied to determine whether any end devices match the filters. In doing so, an algorithm iterates through combinations of mask bits to identify the target end devices and to disregard non-target end devices. Therefore, a single broadcast is sent for each filter and received by all end devices. The present inventive concept assures that each filter matches no non-target end devices, and that every one of the original target end devices matches only one filter so that an advertisement message is broadcast and received by only those end devices. Any time an end device's address matches a filter it can accept and process that message. More specifically, each message contains one filter, and each filter matches a subset of the target devices, while not matching any non-target devices. When an end device receives a message, it compares the filter to its own address, or more specifically, matching relevant bits of its address to the filter. If there is a match, then the device processes the message. This permits multiple devices to receive a message corresponding to a single filter. The mask in identifying relevant value bits. i.e., those mask bits having a '1' value, permits each device to perform a comparison between its address and the received filter with respect to relevant bits. The address only has to match the value string at "relevant" positions, and the other positions can contain any values.

Figure 1:
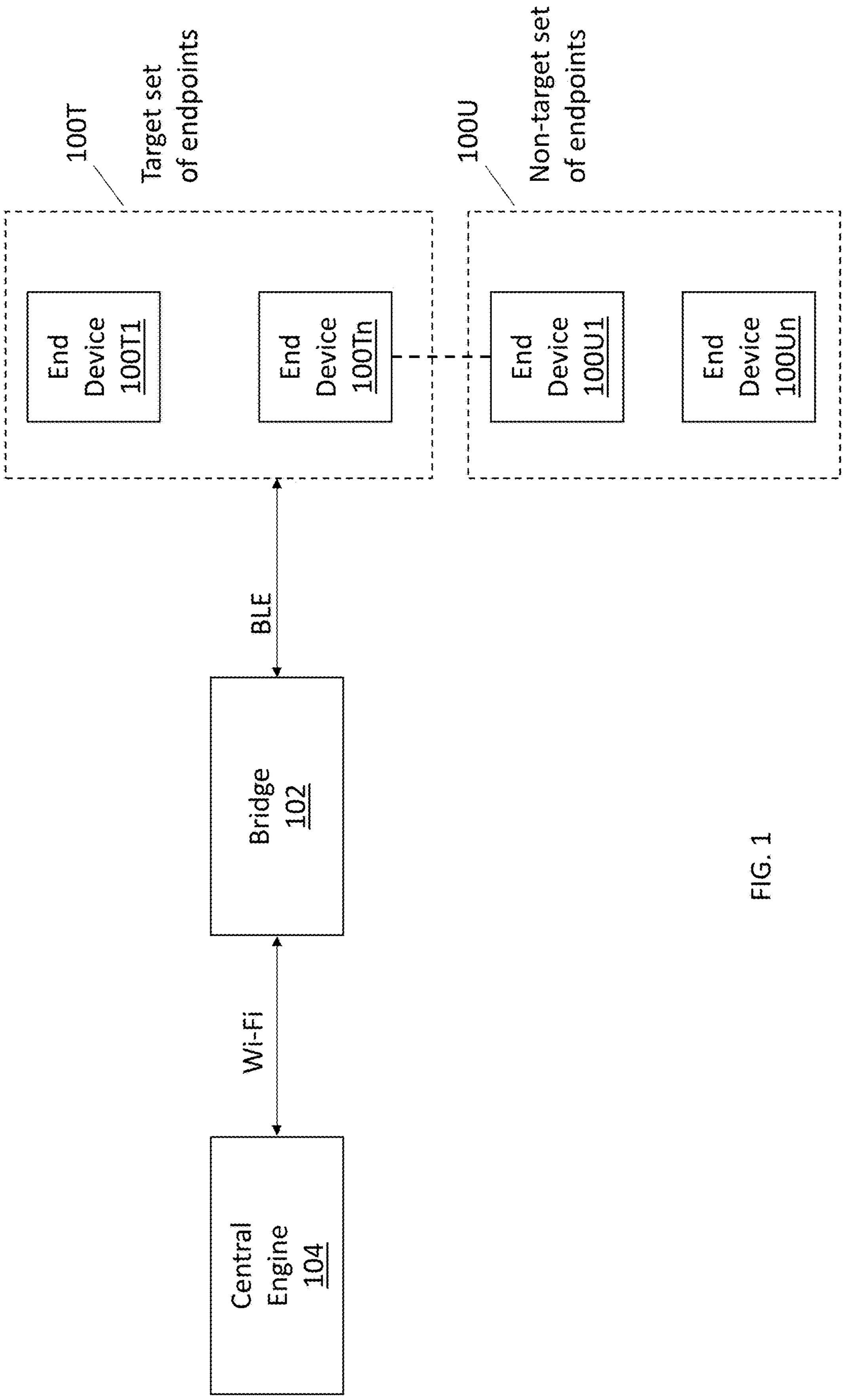
FIG. 1 shows a block diagram of a wireless communication system, in accordance with some embodiments of the present inventive concept.

FIG. 1 shows a block diagram of a wireless communication system, in accordance with some embodiments of the present inventive concept.

The system includes a plurality of mobile electronic apparatuses, referred to as end devices 100. In some embodiments, the end devices 100 may be small portable Internet-of-Things (IoT) devices that can be placed on people or objects at a location such as a building. In some embodiments, the end devices 100 can be constructed and arranged as electronic tags, labels, clips, or the like, for example, described in U.S. patent application Ser. No. 17/588,993, filed Jan. 31, 2022, and entitled "Article-Identification-and-Location Device Systems and Methods of Using Same" and in U.S. patent application Ser. No. 63/430,592, filed Dec. 6, 2022, entitled "Radio Frequency (RF) Power Conditioning for Wake-Up Circuit," the contents of each of which is incorporated herein in its entirety.

The end devices 100 can exchange data with each other and/or one or more bridges 102 via the BLE protocol or other wireless technology, e.g., at radio frequency (RF) spectrums, that includes the use of advertising packets or the like for establishing a communication and transmission of data between multiple wireless electronic devices. A bridge 102 can serve as an intervening computer between a cloud computing environment and controllers or other processing devices, such as a central engine 104, in particular, detecting BLE signals from the end devices 100 and processing the IDs received in the BLE signals for output to the central engine 104. In some embodiments, the central engine 104 includes a BLE interface and exchanges BLE signals directly with the end devices 100 in the absence of the bridge 102.

The bridge 102 can communicate with the central engine 104 via wired or wireless communication, such as Wi-Fi or the like. The central engine 104 can store and process one or more complex algorithms for making decisions about setting alarms or other control-related signals, for example, when to activate an LED or the like of one or more end devices 100. This permits the central engine 104 to change alarm threshold settings without needing to communicate with the end devices 100, and to consider information that the end devices 100 wouldn't have, for example, detecting whether a human is in a room with the end devices 100. For example, a tracking system with cameras, sensors, or the like, may independently collect such information. When an alarm is triggered in this example, e.g., a human is detected by a motion sensor, camera or the like, this information can be processed by the central engine 104 for activating an alarm, and in turn can activate the LEDs on those end devices 100 of interest to the human in the room.

The central engine 104 can receive, store, and process location information, end device identifiers (IDs), addresses, and the like, and other information from the bridge(s) 102. The central engine 104 has a memory that can store two lists of end devices 100: a first list of IDs, addresses, or the like corresponding to targeted end devices and a second list of IDs, addresses, or the like corresponding to non-targeted end devices, described in detail below. In other embodiments, the bridge 102 and central engine 104 are co-located and share processors, memory, I/O, and so on and may communicate with the end devices 100 identified as having a group identifier (described below) via BLE or the like. The system may include other electronic devices such as beacons, routers, and/or other components for facilitating electronic communications between the bridge(s) 102, central engine 104, and/or end devices 100.

A typical BLE advertising data exchange includes a beacon device of the end devices 100 broadcasting packets, or advertisements to every device within a region of the end device 100 in order to allow the bridge 102 to detect, identify and collect data from it. An advertising packet may transmit a packet of information that includes an ID such as a universally unique identification (UUID), and other information that includes a device IP address, website URL, and so on. If the end device 100 moves, the end device 100 may retransmit an advertising message including new information regarding the move. The BLE communication can trigger an action from the central engine 104 such as sending a message to control the end devices 100. In doing so, the bridge 102 can output control signals based on a decision by the central engine 104 by the manner in which alarms or the like are provided to the end devices 100 based on sensor data advertised by the end devices 100.

Figure 2:
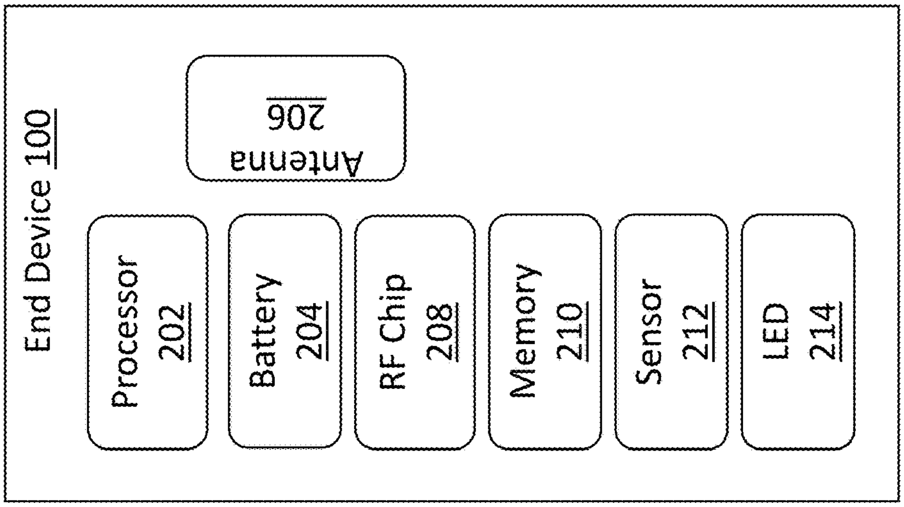
FIG. 2 is a block diagram of components of an end device of FIG. 1, in accordance with other embodiments.

FIG. 2 is a block diagram of components of an end device 100 of FIG. 1, in accordance with other embodiments. As previously described above, the end devices 100, i.e., the target end devices 100T and/or non-target end devices 100U, can be constructed and arranged as an electronic tag, clip, or other movable object positioned on or proximal to an item or person.

The end device 100 can include a processor 202, a battery 204, an antenna 206, an RF chip 208, memory 210, sensor 212, and LED 214. Although not shown, the end device 100 can include an electronic display, speaker, peripheral devices, and/or other computer components known to those skilled in the art for communicating information related to a BLE message exchange.

The RF chip 208 may include a transceiver, e.g., a low energy BLE transceiver, that communicates with the antenna 206 to transmit and/or receive radio signals, e.g., Bluetooth RF signals or the like. The RF chip 208 can operate as a beacon (e.g., a BLE beacon), which includes a low-energy RF transmitter and a microcontroller that can be programmed to operate with logic, and/or communicate with the processor 202 to operate accordingly.

Although an RF chip is described, the end device 100 may include other wireless communication technologies, such as 802.XX, WLAN and ultra-wideband (UWB), and so on. The RF chip 208 can be connected to a processor 202 for controlling the operation of the RF chip 208. The processor 202 may execute software stored in the memory 210, for example, program code which when executed controls the various functionalities of the device 100 described herein. The sensor 212 may sense a change of state of the end device 100, for example, motion, altitude, angular, contact, or the like, and provide data signals to the processor 202, memory 210, chip 208, and/or antenna 206 to provide a communication of the change of state. The end device 100 can generate BLE advertisements or the like that includes information regarding the change of state, which can be used by the central engine 104 for decision-making purposes, e.g., determining whether to illuminate the LED 214 of the end device 100 based on the received information. For example, the sensor 212 may include an accelerometer connected to processor 202 for detecting motion of the device 100, and advertise the state of the accelerometer over time. Here, the central engine 104 can process this data to determine movement-related information about the end device 100. A speaker (not shown) may provide audible tones and/or the LED 214 may provide visual indicia such as a light for use in locating a misplaced or out-of-sight device 100 when the central engine 104 determines that the LED 214 of the end device 100 is to be activated, for example, when the central engine 104 determines that a person is in a room for retrieving an object to which the end device 100 is attached.

The battery 204 may provide power to the other components of the end device 100. The methods described herein can reduce the use of the battery 204 during operation and extend its life. In some embodiments, the end device 100 does not include a battery but instead relies on received RF signals to power at least these devices, for example, as described in U.S. patent application publication number US-2022-0151361-A1, filed Jan. 31, 2022, titled "Article-identification-and-location Device and Systems and Methods of using Same" the entirety of which is incorporated by reference above.

Figure 3:
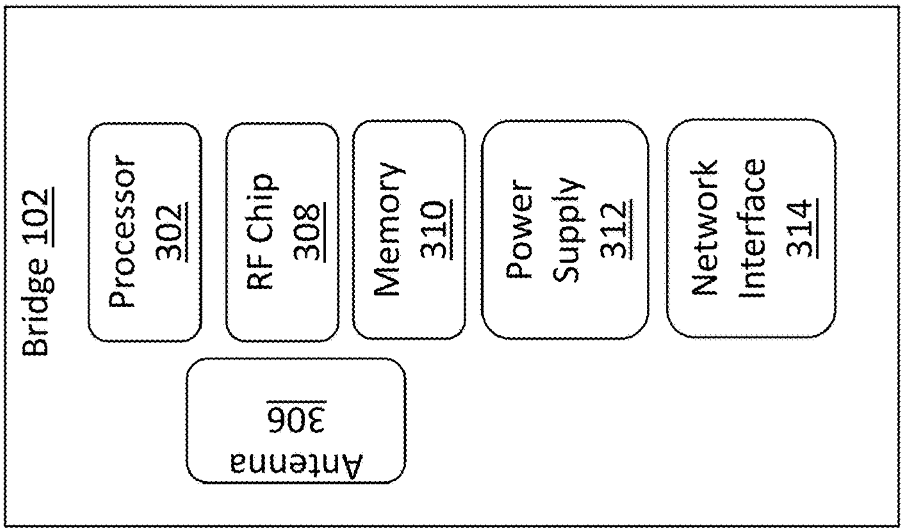
FIG. 3 is a block diagram of components of a bridge of FIG. 1, in accordance with other embodiments.

As described above, preferred embodiments include one or more BLE dongles of the end devices 100 directly connected to the central engine 104. However, FIG. 3 illustrates another embodiment, namely, a block diagram of components of a bridge 102 of FIG. 1, in accordance with other embodiments. The bridge 102 may be part of a computer network, but not limited thereto.

The bridge 102 can include a processor 302, antenna 306, RF chip 308, memory 310, power supply 312, and network or serial interface 314. In some embodiments, the bridge 102 may operate as a wireless microcontroller (MCU).

The RF chip 308 may include a transceiver, e.g., a low energy BLE transceiver, that communicates with the antenna 306 to transmit and/or receive radio signals, e.g., Bluetooth RF signals or the like with one or more end devices 100. This may include a broadcast scheme, where multiple advertisements are exchanged. The RF chip 308 may include a microcontroller that can be programmed to operate with logic, and/or communicate with the processor 302 for controlling the operation of the BLE chip 308.

The network interface 314 may also connect to and electronically communicate with the processor 302 for transmitting and receiving Wi-Fi, Ethernet, or other related signals in communication with the central engine 104. In some embodiments, the network interface 314 may be constructed and arranged to receive a BLE dongle, for example, providing an MCU and Bluetooth® radio in one chip. In other embodiments, in the absence of the bridge 102, the central engine 104 may include at least one BLE dongle directly connected to the central engine 104, for example via a USB port.

In some embodiments, the antenna 306 can transmit and receive a combination of BLE and Wi-Fi RF signals, but not limited thereto. In some embodiments, the network interface 314 is similar to or replaced by the RF chip 308 for exchanging Bluetooth RF signals, for example, BLE advertisements, with the central engine 104.

The power supply 312 can be connected to the processor 302, antenna 306, BLE chip 308, memory 310, and network interface 314 for powering these devices, e.g., applying a source of alternating current (AC) and/or direct current (DC).

Figure 4:
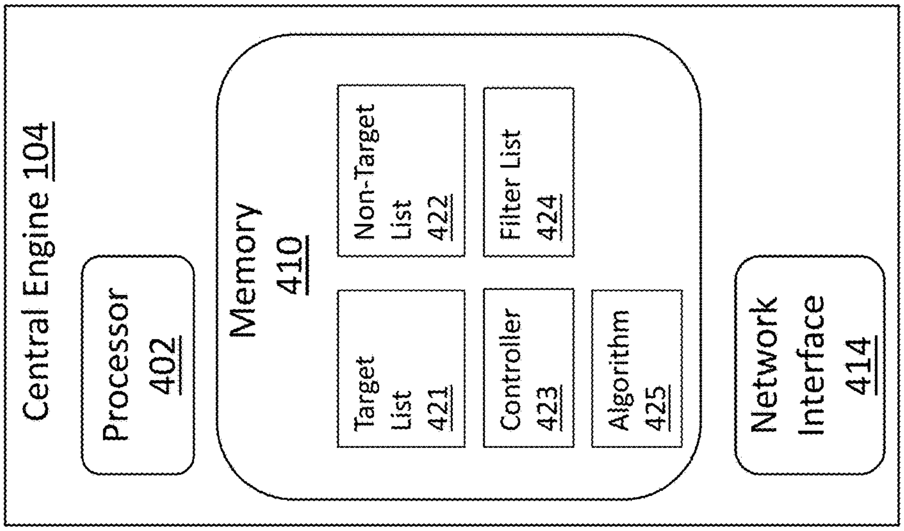
FIG. 4 is a block diagram of the central engine of FIG. 1, in accordance with other embodiments.

FIG. 4 is a block diagram of the central engine 104 of FIG. 1, in accordance with other embodiments. The central engine 104 may coexist with the bridge 102 as part of a computer network, but not limited thereto. The central engine 104 may include or be part of a computer server or the like.

The central engine 104 can include processor 402, memory 410, and network interface 414 for receiving information from one or more bridges 102, e.g., Bluetooth™ WIFI®, or a combination thereof. The information may include electronic data provided in BLE advertising packets from one or more end devices 100, for example, location information and other updated data retransmitted by the bridge 102 to the central engine 104.

The central engine 104 can process the contents, in particular, unique identifiers of the end devices 100 that populate an address field of received messages from the end devices 100, and can determine from the message contents whether to associate the corresponding end device(s) 100 in a target list 421 or a non-target list 422. In some embodiments, the target list 421 can include multiple device addresses or related end device identifiers of the target end devices 100T that a subsequent message is to be sent to from the bridge 102. An example of a process for associating end devices 100 with a stored list is described in method 500 of FIG. 5 below.

The memory 410 can also store a controller 423 having program code that when executed by the processor 402 can send control signals via advertising packets or out-of-band messages to the end devices 100 via a bridge 102. In some embodiments, the controller 423 outputs messages to only those end devices 100 shown in FIG. 1 identified by their addresses or other identifiers stored in the target list 421. In other embodiments, a group address that represents the target end point identifiers in the target list 421 can be used by the controller 423 to send a control signal to the target end devices 100T, and not to non-target end devices 100U1-100Un (generally, 100U) in the non-target list 422, for example, which can permit control information in messages directed at the target end devices 100T to illuminate the LEDs 214 of the target end devices 100T.

Accordingly, referring again to FIGS. 2-4, a plurality of end devices 100 in a common area such as a room can be managed by a central device such as a combination of the bridge 102 and central engine 104 under the data transmission constraints where many devices communicate on a shared medium such as a radio channel and all end devices 100 receive a broadcast from the bridge 102. In doing so, the central engine 104 can group the end devices 100 in a predetermined manner by performing an iterative filtering process so that only those end devices in a target list receive communications from the central engine 104, which can reduce the total communication bandwidth by limiting the BLE message exchanges to those between the target end devices 100T and the bridge 102.

Figure 5:
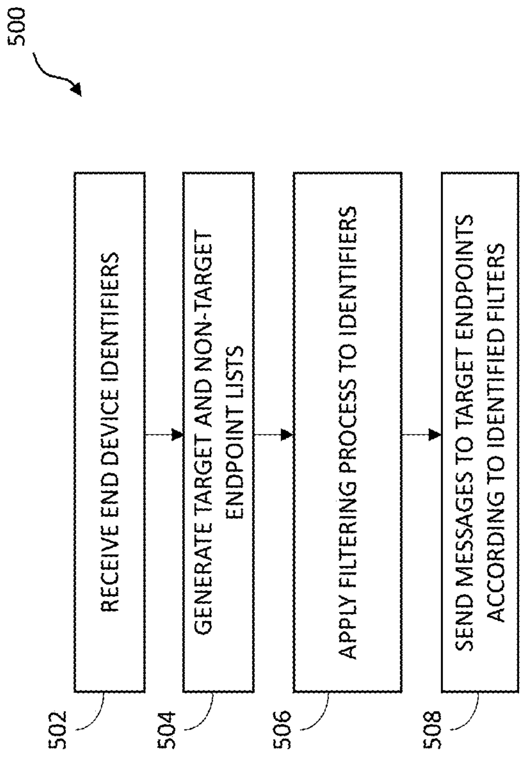
FIG. 5 is a method for managing a message exchange between wireless end devices communicating on a shared medium such as a wireless radio channel, in accordance with some embodiments.

FIG. 5 is a method 500 for managing a message exchange between wireless end devices communicating on a shared medium such as a wireless radio channel, in accordance with some embodiments. In describing the method 500, reference is made to elements of FIGS. 1-4.

At step 502, the central engine 104 receives a UUID, address, or other identifier for each of a plurality of end devices 100. That list must contain the identifiers of all end devices within range of the central engine and/or bridge(s).

At step 504, a first set of identifiers corresponding to targeted end devices and a second set of identifiers corresponding to non-targeted end devices are arranged by the central engine 104 into a first list, or target list 421 and a second list, or non-target list 422. For example, the end devices 100T in the abovementioned example sending an alarm or LED status may be associated with the target list 421 so their identifiers, e.g., addresses, may be stored in the target list 421. In this example, the end devices 100U that do not include an alarm with their advertising messages to the bridge 102 are stored in the non-target list 422. To distinguish the target end devices 100T from the non-target end devices 100U, the central engine 104 may rely on a special-purpose algorithm 425 stored as program code in the memory 410 to determine the conditions for an alarm, establishing alarm thresholds, and so on, for example, establishing a rule that an alarm condition only applies to end devices that populate a field in an advertising message with a sensor movement status. As described herein, the objective of this algorithm 425 is to take a list of target clips (which are intended to be communicated with), and non-target clips present in the system, and to generate a set of "filters" such that the group of filters as a whole represent every target end device exactly once. The advantage here is that when sending out a message using a filter to identify the target devices, only one message needs to be sent per filter, rather than per target end device.

At step 506, a filtering process is applied to the end device identifiers stored in both the target list 421 and the non-target list 422 for the purpose of grouping target end devices under a generated filter in a manner so that only these end devices process an advertisement or other message. Stored in the memory 410 may include a filter list 424 that includes one or more filters, for example, generated according to a pattern matching technique, for example, described with respect to the method 600 of FIG. 6. In the filtering process, each filter (which includes a string of bits representing a set of end device addresses)) is generated to correspond to at least one target end device 100T in such as a way that whether an end device address does or does not belong to the set of addresses can be calculated based upon the content of the filter, and the content of the address. In doing so, all target end devices 100T have a corresponding filter. None of the non-target end devices 100U have a corresponding filter since there is no planned communication from the bridge 102 to the non-target end devices.

At step 508, a communication, e.g., a message, can be sent from the bridge 102 to one or more target end devices 100T1-Tn for each filter in the filter list 424. For example, if six filters are generated in step 508 for twenty target end devices 100T1-T20, then six communications are sent from the bridge 102 to the twenty end devices, for example, shown in FIG. 8C. In contrast, a conventional messaging scheme where the bridge sends advertising messages sequentially to each of the twenty target end devices would require twenty communications from the bridge to the target end devices.

Referring again to the contrast with a conventional messaging scheme where the bridge sends advertising messages sequentially to each of the twenty target end devices would require twenty communications from the bridge to the target end devices, the lossy nature of broadcasts cause an issue for many radio broadcast systems, but in particular for BLE as the way they achieve low energy is by keeping the radio cycled off much of the time in the peripherals. Maximum transmission sizes are very small. There are a lot of factors that effect this, but for common configurations, for example, 24 bytes can be transmitted at a time. The types of messages transmitted in accordance with the inventive concept are intended for a particular target, generally some level of receipt guarantee, or receipt confirmation is desired. At least a fair level of confidence that the message has reached its desired destination.

In cases where one broadcast message is sent with a list of targets and the payload, rather than individual messages for each target, within the context of BLE, this would not be possible due to the maximum transmission size. One solution is described in FIG. 5, with the exception that the message is divided into segments using the maximum transmission size, which may end up being fewer messages than the number of targets. In applying this scheme, it would be critical that every target receives every message (every segment) in order to guarantee that they have enough information that they know that they are targeted and what the payload is. Due to the lossy nature of the medium, and the various costs associated with methods of receipt confirmation (which increase as more confirmations are required for each message) it is likely that this still ends up taking more time than the original method of sending one message per target. Though which method was more effective would depend on various factors like how lossy the medium is, and what method of receipt confirmation was used.

Modern broadcast transmissions entail the segmented approach, which is superior to a one-to-one, or one message per target, approach, the algorithm above can be applied to generate a list of filters rather than a list of target addresses, and then can send out a segmented list of filters rather than the addresses. Because the filters are the size of two addresses (the size of two in the worst case, but given that most of the value portion of the filter can often be omitted, it will most often be smaller than that), and the filters on average are able to represent more than two addresses, it will still reduce the amount of data, and therefore the total number of messages sent.

Figure 6:
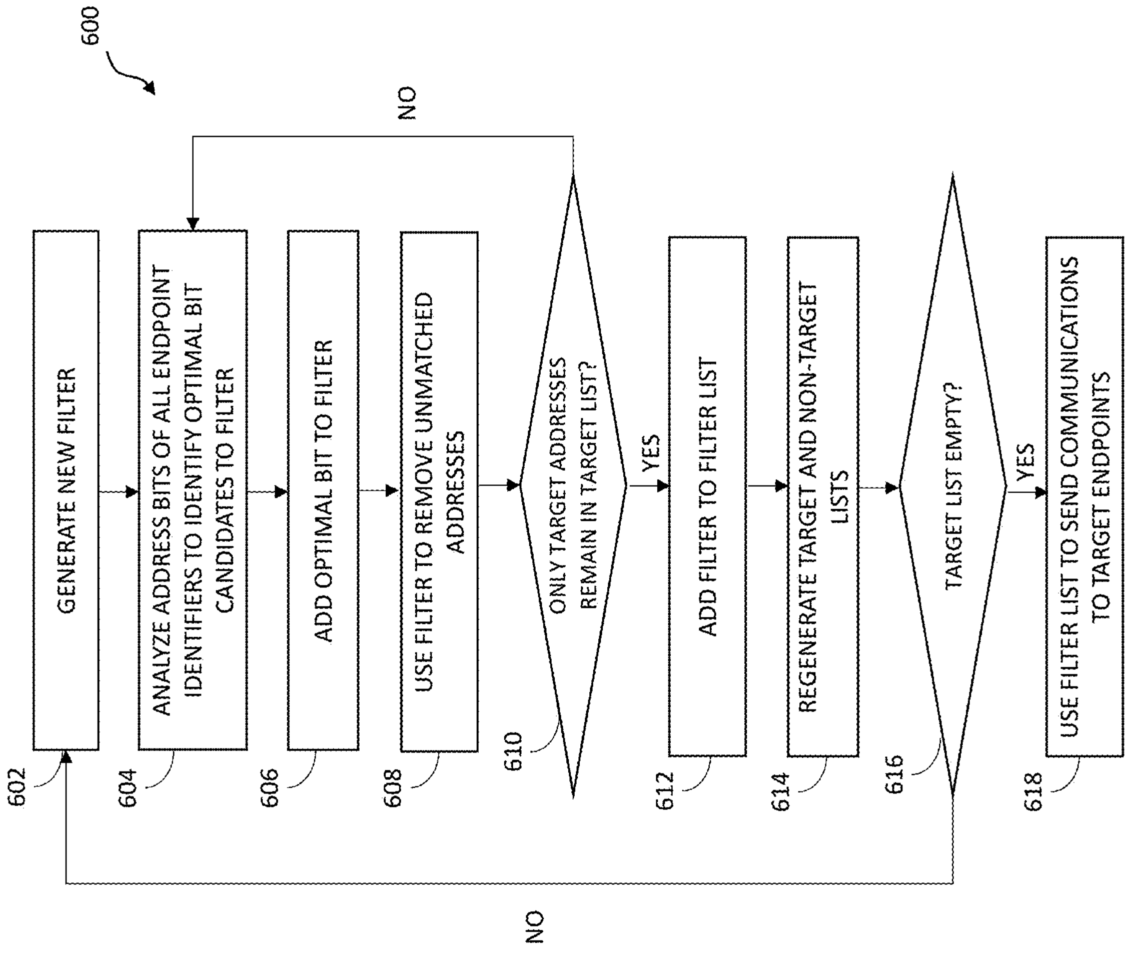
FIG. 6 is a method for generating a filter list for optimizing communications with a plurality of wireless end devices communicating on a shared medium such as a wireless communication network, in accordance with some embodiments.

FIG. 6 is a method 600 for generating a filter list for optimizing communications with a plurality of wireless end devices communicating on a shared medium such as a wireless communication network, in accordance with some embodiments. In describing the method 600, reference is made to elements of FIGS. 1-5. For example, the method 600 can be implemented to generate the filter list 424 described with reference to FIG. 4 and method step 506 of FIG. 5.

The method 600 begins at step 602 with the generation of a new blank filter.

At step 604, the address bits of the end device identifiers in both the target list 421 and non-target list 422 are analyzed to identify optimal bit candidates that can be used for generating filters representing a group of end devices 100 to which the bridge 102 desires to communicate with. In some embodiments, the address bits are analyzed to identify common bits, with matching bit indices and values to create a filter. The address bits from both lists are analyzed to ensure that the filters do not match any untargeted addresses while maximizing the number of targeted addresses matched. All of the addresses of all the devices 100 in the configuration must be known to ensure that the only addresses that the filter can match are target addresses.

In some embodiments, a filter comprises a mask component and a value component. For example, a '1' bit in the mask component can indicate that the corresponding position in the value string component is relevant. The mask component is a set of bits indicating which bits of the value component are relevant, and which bits are not relevant. The value includes a set of bits to be compared against what is being filtered. The mask and value components include a number of bits that are the same as the size of the addresses being compared against. For example, when 4-bit addresses are filtered, then the mask and value are 4 bits each. Referring to the example in FIG. 8C, a filter 811 may have a 48 bit mask 813 that identifies the bits in the corresponding 48 bit value that are relevant for comparing against the identifiers of a plurality of wireless devices configured as electronic clips in a room. In this example shown in FIG. 8C, a filter 811 has mask 813 including mask bits 3, 12, 16, 27, 29, 32, 38, and 38 have a high value (1) and therefore corresponding value bits 3, 12, 16, 27, 29, 32, 38, and 38 are compared to the bits of the electronic clips. In this example, there is a match with five clips so the filter 811 is created to correspond to the five clips so that the filter at step 602 pertains to the five clips subsequent communications may be established to this group of five clips.

In some embodiments, the algorithm 425 may provide a criteria to determine whether a value bit is "optimal," or considered for use in filtering addresses from the target list 421 and/or non-target list 422. For example, a criteria may establish that an optimal value is one that matches the most target end devices from the target list 421. The criteria may further establish that in the event where two or more candidate bits are identified as matching the fewest target end device addresses, a "tie breaker" is implemented where the bit candidate to be selected for addition to a filter must have a bit index and value that the fewest non-target end device addresses have in common, and when applied must filter the greatest number of non-target end device addresses from the non-target list 422. Here, the central engine processor 402 executes the algorithm 425 stored as program code in the memory 410 to identify all of the targeted end devices having a bit index and value in common. For example, referring to FIG. 8C, five target clip addresses have a common bit index and value 814. Similarly, the bits of the non-target end devices are analyzed to identify a bit index and value that one or more of the non-targeted end device addresses have in common. At step 606, the optimal bit is added to a filter because it can filter the fewest number of target addresses among all possible bit indexes and values analyzed in step 604. In particular, identified common attributes, or more specifically, the optimal bit index and value, are added to the filter. Referring again to step 602, an initial filter may be a blank filter, and have an initial Mask: 0000 Value: 0000, which does not filter any target endpoints. For example, after iterating through all possible bit indexes of the masks and values, i.e., analyzing at step 604 all possible values, the algorithm 425 determines that Value: 0000 Mask: 0001 filters no target endpoints, or the fewest number of target endpoints among the possible masks and values. In doing so, the blank filter above is modified to include the optimal bit, and to have a value 0000 0001.

At step 608, addresses from the target and/or non-target lists that do not match the optimal bit(s) of the filter are removed from the respective lists. As described below, a target address removed in this manner does not mean that the target address is no longer part of a communication medium with the bridge 102 but rather the target address does not correspond to the current filter being generated. Instead, the removed target address may be determined to be part of a different filter to be generated in subsequent steps.

If at decision diamond 610 only target addresses remain in the target list 421, then at step 612, the resulting filter is generated and added to the filter list 424. Otherwise, the method 600 returns to step 604.

After a filter is added to the filter list 424 in step 612, the method 600 proceeds to step 614 where the target list 421 and non-target list 422 are regenerated such that any addresses in the previous target list 421 which match a filter in the filter list 424 is placed in the regenerated non-target list. This assures that each target address corresponds to one and only one filter in the filter list 424.

For example, after a first filter is generated (associated with 2 of the 3 target addresses), the remaining third target as part of the regenerated list has a status of "target." As discussed above, the other two targets now have a status of "non-target" because they have been identified as part of the first filter. When the process is performed to generate the next filter, the second filter is constructed to identify with the one remaining target. Everything identified as "non-target" (including the two original targets now part of first filter) are excluded from this second filter.

At decision diamond 616, a determination is made whether the regenerated target list is empty. If yes, then each target address corresponds to a filter in the filter list 424 and the method 600 proceed to step 618 where the filters in the filter list 424 are processed so that the bridge 102 can send communications to target end devices according to the filter list 424. After performing the method 600, the filter list 424 can represent the group of devices, i.e., target end devices 100T for communicating with the bridge 102. A message can be sent once for each filter. When sending out a message using a filter, the message is broadcast with the filter as part of the payload, and any device that receives it will make the determination of whether or not to discard the message based upon whether the filter matches their address or not.

Figure 7:
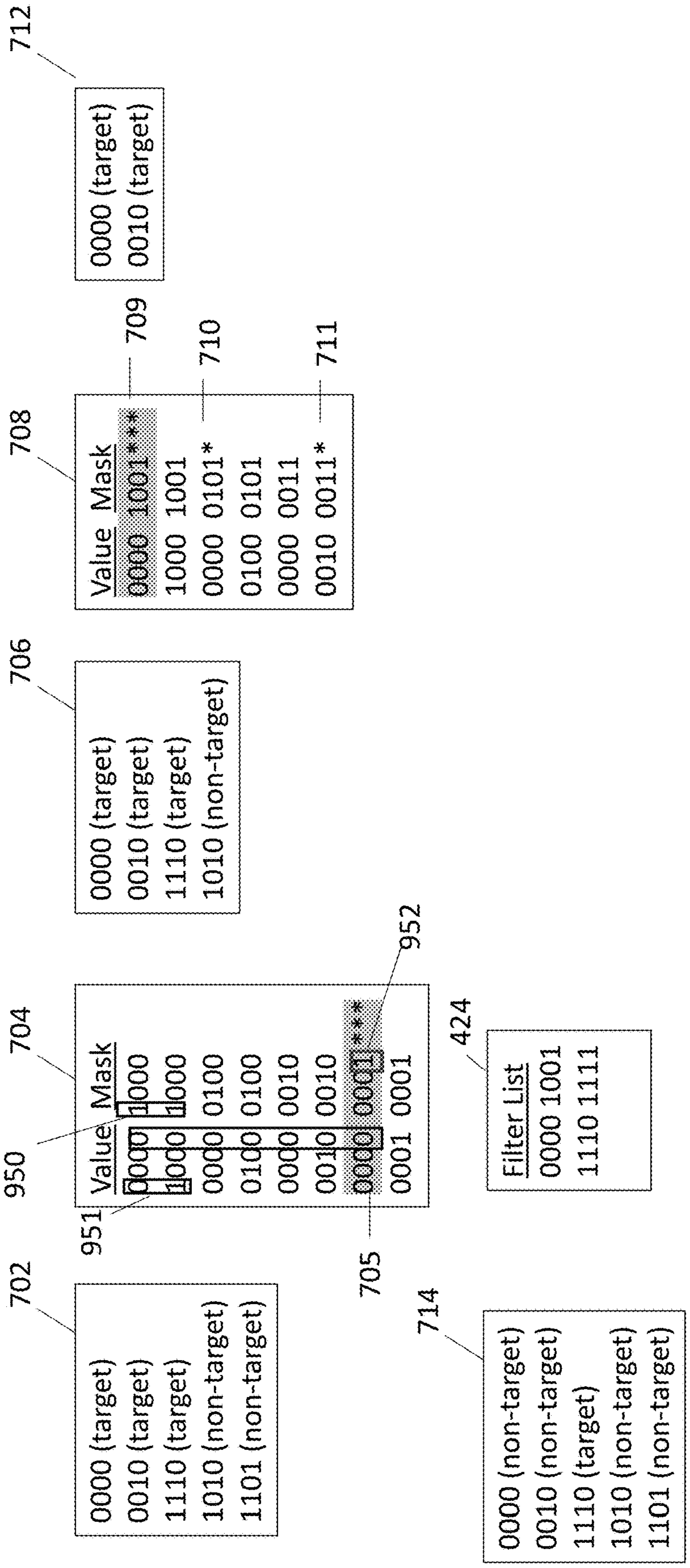
FIG. 7 is an illustration of an application of the method of FIG. 6.

FIG. 7 is an illustration of an application of the method 600 of FIG. 6.

Addresses for a plurality of electronic clips 702 are identified. Three of the clips may be target clips with addresses that are stored in the target list 421. The other two clips may be non-target clips that have addresses stored in the non-target list 422. An objective is to generate filters for the three target clips.

A plurality of non-exhaustive bit strings 704 having a value portion and a mask portion are applied to determine whether any of the clips 702 match the filters. In doing so, the algorithm 425 iterates through all possible bit indexes (locations of bits in a bit string) and values to determine a bit string that 704 filters the fewest target addresses. The algorithm 425 determines that the mask filter 705 filters the fewest target clip addresses, i.e., 0 are filtered, among the filters 704. In particular, in the first filter generation iteration, the filter 705 (Value: 0000 Mask: 0001) is determined to filter no targeted clips. The last bit 952 of the mask: 0001 is selected as an optimal bit to add to a blank filter (0000 0000).

The resulting bit string (0000 0001) is used to remove addresses from the initial list 702. A new list 706 is generated. As shown the non-target address (1101) is absent from the new list 706 because the eighth bit (1) 952 does not match the selected optimal bit of the filter.

Each address bit is again analyzed to identify a bit index and value that as many targeted clips have in common, and as few non-targeted clips as possible. In doing so, as shown in the filters 708, three mask filters 709, 710, 711 are determined to produce the fewest target address matches, i.e., 1 match. However, in accordance with a predetermined condition established in step 604, a "tie breaker" is implemented where the bit candidate to be selected for addition to a filter must have a bit index and value that the fewest non-target end device addresses have in common. Accordingly, the newly identified '1' bit is added as another optimal bit for generating the filter (1001). Here, since only target addresses remain, the new filter (0000 1001) filters the remaining untargeted address as well as one target address, as shown in the new list 712. The first filter (0000 1001) is added to the filter list 424 for targeting the two target addresses (0000; 0010).

After selecting the first filter corresponding to two target addresses (0000 and 0010) of the three target addresses, the original list of clips is recreated as a new list 714, but the two target addresses (0000; 0010) for the first filter are now identified as non-target addresses to ensure that each clip is covered by one filter. Since the list 714 includes at least one target address (1110), the iterative analysis is repeated until a filter is identified that only corresponds to target address 1110. A second filter (1110 1111) is identified and added to the filter list 424.

The two filters in the filter list 424 are used to send messages to all members in the target set, and none of the non-target set. More specifically, one message is broadcast per filter. The clips whose addresses match the filter will all process that single message.

Figure 8A:
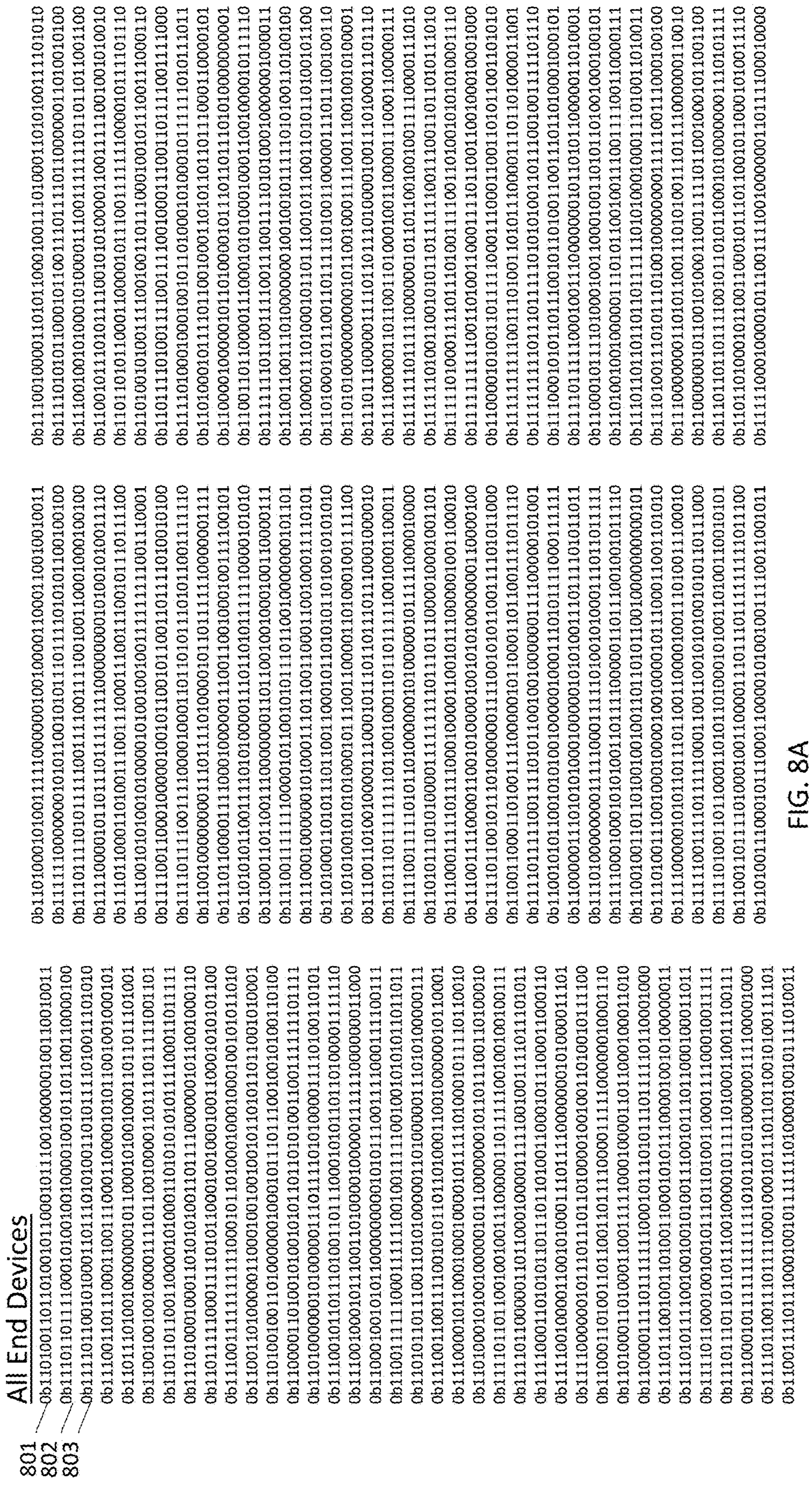

FIGS. 8A-8C are views of a test program result produced according to the method 600 of FIG. 6. FIG. 8A includes the identifiers of 100 electronic clips configured to communicate with each other and/or other computing devices over a shared medium, e.g., an IoT RF channel. FIG. 8B includes the addresses of 20 target clips, for example, addresses 801, 802, and 803. The remaining addresses shown in FIG. 8A can be referred to as non-target addresses.

FIG. 8C includes six filters 811, 821, 831, 841, 851, 861 that are generated for the target end device addresses shown in FIG. 8B. Each filter includes a value 812 and a mask 813. The system can generate the filters to match with the 20 target clips according to the filtering process of FIG. 6.

For example, the '1' bits in the mask 813 identify which bits in the corresponding value 812 of the end device identifiers that are relevant for a given communication. The clips listed as in the filter 811 are the only clips out of all the clips 120 that have the correct value bits at index locations 3, 12, 16, 27, 29, 32, 38, and 48 shown in FIG. 8C. For example, the last bit is a '1' bit, so the last bit is a relevant bit, and therefore, the five clips fall under the first filter 811 because they have an address that has a last bit 814 as a '1' bit, in addition to matching all other relevant bits. In another example, a second filter 821 includes a bit 823 of a mask identifies a relevant bit 822 that is a '0' bit in the corresponding value. In a third example, a bit 815 of a chip address has a '1' value but does not match the corresponding value bit, which has a '0' value. However, the abovementioned rule applies because the corresponding bit in the mask is 0, so the address matches the filter. The five clips under the second filter 812 each has a common bit 824 as a '0' bit. The five clip addresses under the second filter 821 are different than the five clip addresses under the first filter 811. Accordingly, each of the 20 target clips are represented by one of the six filters 811, 821, 831, 841, 851, 861. Accordingly, each filter permits a single communication to be output from a BLE device such as the bridge 102 to the clip addresses under the filter, for a total of six communications from the bridge to the target clips 100T, one communication for each filter.

Accordingly, the foregoing embodiments can be used in applications to assist people in locating specific products at a business or home. For example, a company that cleans laundry may hang articles of clothing on racks. End devices 100 in the form of clips or tags may be attached to the articles of clothing or racks. In a related example, the racks of clothing may be arranged in a predetermined manner so that personnel can quickly identify clothing of interest. However, the laundry racks may be unintentionally reshuffled where end devices are relocated. In doing so, the system may illuminate the end devices 100T, e.g., tags on clothing that has been moved.

Figure 9:
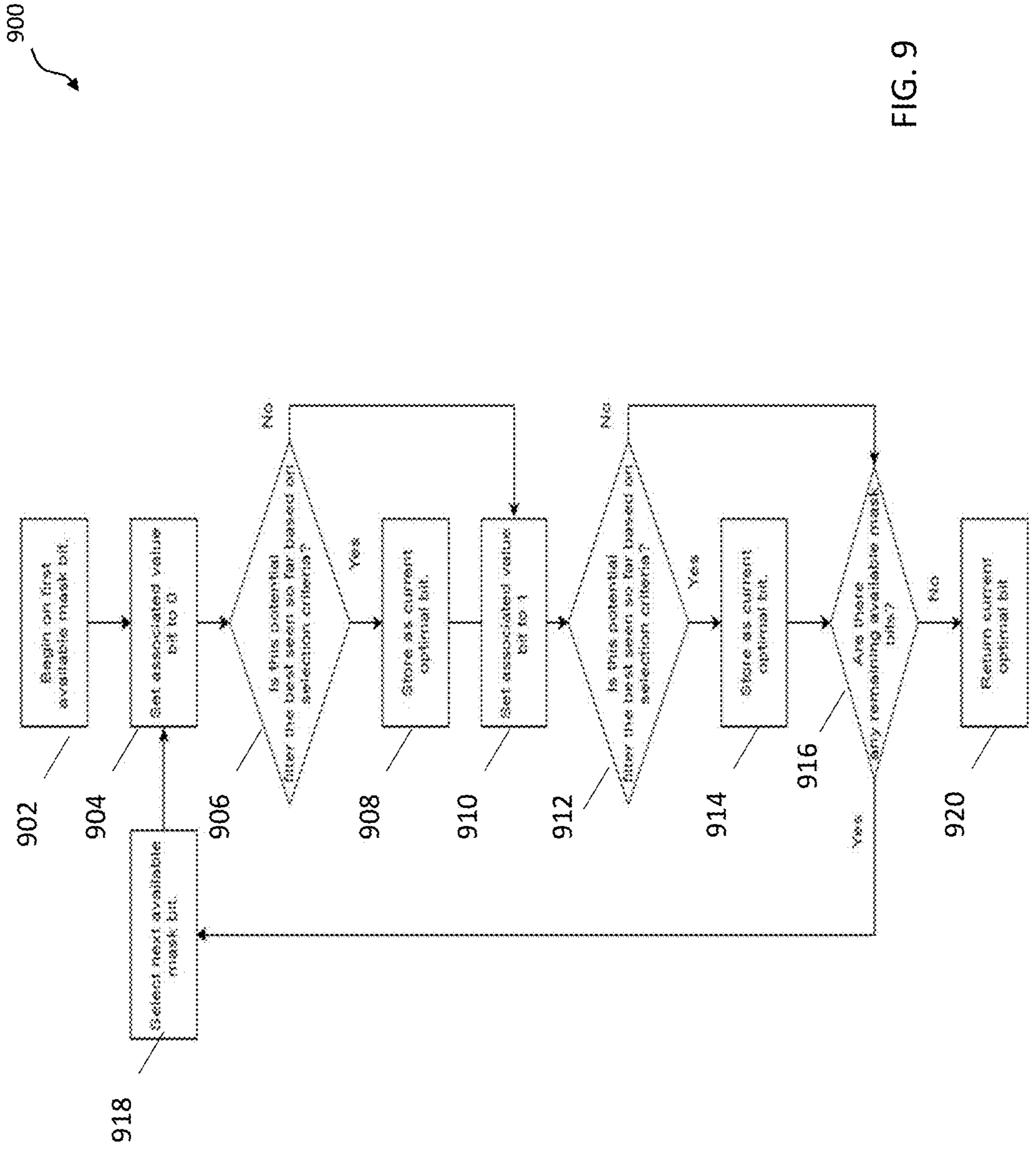
FIG. 9 is a flow diagram of an optimal bit selection process, in accordance with some embodiments.

FIG. 9 is a flow diagram of an optimal bit selection process 900. In describing the process, reference is made to examples of selecting optimal bits provided in FIGS. 6-8C.

As described above, a feature of the present inventive concept is that a filter mask formed of a bit string is produced to indicate which bits in a set of end device identifiers are relevant for a given electronic communication with a BLE transmitting device such as the bridge 102. For example, a filter may include a mask: 0100 and value: 1011. Here, the mask represents the second bit index of the value string, which is a 0 bit.

In order to identify such mask bits, at step 902, a first available mask bit is analyzed. For example, as shown in FIG. 7, the first available mask bit 950 is the 5th bit index.

At step 904, the mask bit, in this example, the first available mask bit, is set to a binary value of 0 (e.g., 951).

At decision diamond 906, a determination is made whether the '0' value bit satisfies a predetermined selection criteria, e.g., that the '0' mask bit filters the fewest target end devices from the target list, or in the case of a tie filters the most end devices from the untargeted list described with respect to the method 600 in FIG. 6. As shown in the bit strings 704 of FIG. 7, each mask bit is analyzed twice, with a different corresponding value bit 951. This may be referred to as the "optimal bit" or bit pair to add to a filter, i.e., mask filter 705, because it filters no target clips, while all other options filter at least one target clip.

If yes, then at step 908, the mask bit is stored as a current optimal bit.

At step 910, the value bit associated with the current mask bit is set to a binary value of 1. At decision diamond 912, a determination is made whether the '1' value bit satisfies a predetermined selection criteria, e.g., that the '1' mask bit filters the fewest target clips from the target list, or in the case of a tie filters the most clips from the untargeted list described with respect to the method 600 in FIG. 6. If yes, then at step 914, the mask bit having the '0' value is stored as a current optimal bit. For example, the '1' mask bit can replace the '0' mask bit as the current optimal bit.

At decision diamond 916, a determination is made whether there are any remaining available mask bits. If yes, at step 918, the next available mask bit is selected, and the method steps 904-916 are repeated on the next available mask bit. If at decision diamond 916, a determination is made that there are no remaining available mask bits for analysis, the method 900 proceeds to step 920 where the current optimal bit at step 914 is stored and added to a current filter.

As will be appreciated by one skilled in the art, aspects of the present invention may be embodied as a system, method, and apparatus. Thus, some aspects of the present invention may be embodied entirely in hardware, entirely in software (including, but not limited to, firmware, program code, resident software, microcode), or in a combination of hardware and software.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting. References to "one embodiment" or "an embodiment" or "another embodiment" means that a feature, structure or characteristic described in connection with the embodiment is included in at least one embodiment described herein. References to one embodiment within the specification do not necessarily all refer to the same embodiment. The features illustrated or described in connection with one exemplary embodiment may be combined with the features of other embodiments.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all the described terms. Any references to front and back, left and right, top and bottom, upper and lower, and vertical and horizontal, and the like are intended for convenience of description, not to limit the present systems and methods or their components to any one positional or spatial orientation. Accordingly, the foregoing description and drawings are by way of example only, and the scope of the invention should be determined from proper construction of the appended claims, and their equivalents.

What is claimed is:

1. A method for wireless communication, comprising:

arranging a plurality of end device identifiers into a first list and a second list, the first list including a plurality of target end device identifiers corresponding to a first group of wireless electronic devices for communicating with a central computing device;

generating a filter list having a plurality of filters such that each target end device identifier on the first list matches with exactly one filter of the filter list, and no end device identifiers on the second list match with any filter of the filter list; and broadcasting electronic messages including the filters of the filter list such that an end device possessing an identifier from the first group receives and processes a message while no devices on the second accept any broadcast messages.

2. The method of claim 1, wherein the filters include a mask component and a value component, and wherein a filter is determined to match a target end point identifier every bit in the end device identifier is either equivalent to a corresponding bit of the value component or has a corresponding bit value of 0 of the mask component.

3. The method of claim 1, wherein generating the filter list comprises:

analyzing the bits of each of the plurality of end device identifiers;

forming a filter of the plurality of filters by iteratively adding relevant bits to the filter and each time a relevant bit is added to the filter comparing the filter to the end device identifiers in the first list and the second list;

removing end device identifiers from the first list and/or the second list that do not match the formed filter; and adding a completed filter to the plurality of filters when the second list is empty; and regenerating the first list and the second list such that end device identifiers from the first list that match one of the plurality of filters are moved to the second list; and repeating the steps of generating filters to add to the filter list and regenerating the first list and the second list until the first list is empty.

4. The method of claim 1, wherein the broadcast electronic messages are in compliance with a low energy Bluetooth™ (BLE) advertising message communication standard.

5. The method of claim 1, wherein the wireless electronic devices are constructed and arranged as electronic tags or clips.

6. A computer system, comprising:

a processor;

a memory device coupled to the processor; and a computer readable storage device coupled to the processor, wherein the storage device contains program code executable by the processor via the memory device to implement a method for processing an electronic communication, comprising:

arranging a plurality of end device identifiers into a first list and a second list, the first list including a plurality of target end point identifiers corresponding to a plurality of wireless electronic devices for communicating with a central computing device;

generating a filter list having a plurality of filters such that each target end point identifier on the first list matches with exactly one filter of the filter list, and no end device identifiers on the second list match with any filter of the filter list; and transmitting electronic messages to the plurality of wireless electronic devices according to the filters.

7. The computer system of claim 6, wherein a filter of the plurality of filters is sent to a group of wireless electronic devices of the plurality of wireless electronic devices, wherein each device in the group of wireless electronic devices compares relevant bits of the filter to a device address to determine whether to process an electronic message received with the filter.

8. The computer system of claim 6, wherein the filters include a mask component and a value component, and wherein a filter is determined to match a target end point identifier when every bit in the end device identifier is either equivalent to a corresponding bit of the value component or has a corresponding bit value of 0 in the mask component.

9. The computer system of claim 6, wherein generating the filter list comprises iteratively selecting an optimal bit index and value that filters the fewest target end point identifiers from the first list.

10. The computer system of claim 9, wherein when two or more candidate bits filter the fewest target end point identifiers, selecting the bit index and value that filters the greatest number of end device identifiers from the second list.

11. The computer system of claim 6, wherein after generating a filter, the first list and the second list are regenerated such that target end point identifiers matching the generated filter are moved to the second list before generating a subsequent filter.

12. The computer system of claim 6, wherein the electronic messages are low energy Bluetooth (BLE) advertising messages.

13. The computer system of claim 6, wherein the wireless electronic devices are electronic tags or clips.

14. An end device, comprising:

a radio-frequency (RF) receiver receiving an RF communication including a bit string that corresponds to a filter, the filter determining one or more intended targets of the RF communication, the RF communication including an identification of which one or more bits of the filter are relevant for determining whether the end device is an intended target;

memory configured to store an address of the end device; and a processor configured to compare the one or more relevant bits of the filter with the address of the end device and to produce a response to the RF communication if each value of the one or more relevant bits of the filter match each value of corresponding bits of the address of the end device, wherein the bit string comprises a mask component and a value component, wherein a bit having a value of 1 in the mask component indicates that a corresponding bit in the value component is relevant, and wherein the processor is configured to determine that the filter matches the address of the end device when every bit in the address of the end device is either equivalent to a corresponding bit of the value component or has a corresponding bit in the mask component with a value of 0.

15. The end device of claim 14, wherein the RF receiver is a low energy Bluetooth (BLE) transceiver.

16. The end device of claim 14, further comprising an LED, wherein the response to the RF communication comprises activating the LED.

* * * * *